US008432476B2

(12) United States Patent
Ashforth et al.

(10) Patent No.: US 8,432,476 B2
(45) Date of Patent: Apr. 30, 2013

(54) MEDIA VIEWING (75) Inventors: Jed Ashforth, London (GB); Simon Barlow, London (GB); Scott Kirkland, London (GB); Matt Southern, London (GB)

(73) Assignee: Sony Corporation Entertainment Europe Limited (GB)

( * ) Notice: Subject to any disclaimer, the term of this patent is extended or adjusted under 35 U.S.C. 154(b) by 160 days.

(21) Appl. No.: 12/979,710

(22) Filed: Dec. 28, 2010

(65) Prior Publication Data
US 2011/0216206 A1 Sep. 8, 2011

(30) Foreign Application Priority Data
Dec. 31, 2009 (EP) .................................. 09252928

(51) Int. Cl.
*H04N 5/222* (2006.01)
*H04N 7/16* (2006.01)
*H04N 7/173* (2006.01)

(52) U.S. Cl.
USPC ............................ 348/333.12; 725/2; 725/110

(58) Field of Classification Search .................. 345/632, 345/633; 382/154; 348/333.02, 333.12; 725/2, 110
See application file for complete search history.

(56) References Cited

U.S. PATENT DOCUMENTS

| 7,084,887 B1 * | 8/2006 | Sato et al. ...................... 345/633 |
| 2006/0038833 A1 | 2/2006 | Mallinson et al. |
| 2006/0071946 A1 | 4/2006 | Anabuki et al. |
| 2007/0024527 A1 * | 2/2007 | Heikkinen et al. ................. 345/9 |
| 2008/0074424 A1 * | 3/2008 | Carignano .................... 345/473 |
| 2010/0208057 A1 * | 8/2010 | Meier et al. ................... 348/135 |

FOREIGN PATENT DOCUMENTS

WO 2009112585 A1 9/2009

OTHER PUBLICATIONS

European Search Report EP09252928, dated May 27, 2010.

* cited by examiner

*Primary Examiner* — Aung S Moe
*Assistant Examiner* — Mekonnen Dagnew
(74) *Attorney, Agent, or Firm* — Lerner, David, Littenberg, Krumholz & Mentlik, LLP (57) ABSTRACT

A portable electronic device comprises a display facing in a first direction, a video camera facing in a second direction substantially opposite to the first direction, and a wireless communications receiver operable to receive supplementary image data from a remote image source, the supplementary image data comprising an indication of where a supplementary image is positioned with respect to a reference image. The portable electronic device is arranged in operation to display a captured image from the video camera on the display of the portable electronic device. When the captured image comprises all or part of the reference image as displayed on a separate display associated with the remote image source, the portable electronic device is arranged in operation to display the supplementary image positioned with respect to the reference image, instead of the corresponding part of the captured image.

15 Claims, 6 Drawing Sheets

MEDIA VIEWING

CROSS REFERENCE TO RELATED APPLICATIONS

The present application claims the benefit of and priority to EP Application No. 09252928.8, filed Dec. 31, 2009, the entire disclosure of which is incorporated by reference herein.

BACKGROUND OF THE INVENTION

1. Field of the Invention

The present invention relates to media viewing.

2. Description of the Prior Art

Conventional audio-visual systems for playing media to be viewed on a television or monitor are able to provide some interactive features, depending on the software associated with the media. Here, "interactive" is taken to mean that the user, or viewer, takes part in the media replay process at some level beyond the simple selection of a media service (e.g. a broadcast television channel) to view. So, rather than the media replay process just being a linear replay of the whole of the selected media service, the order and/or nature of the replayed media depends on input from the viewer himself.

For example, DVDs provide some interactive menus and additional content accessible during normal play of the disk, and Blu-Ray® disks provide similar features. Meanwhile some terrestrial or satellite television receivers such as Sky® set-top boxes have interactive features associated with transmitted programmes and adverts.

Whilst these systems are limited to interaction via just the television screen itself, other systems are able to provide some additional interaction. For example, the Sony® PlayStation 3® (PS3®) and the Sony PlayStation Portable® (PSP®) machines are able to interoperate wirelessly so that a user of the PSP can view content (such as a video) via either the television or via the PSP, and control and interact with the video on the PSP via a so-called 'remote play' function.

However, there is scope to provide further modes of interactivity between a television, a media player connected to that television, and a portable entertainment device.

It is an object of the present invention to mitigate or alleviate the above problems.

SUMMARY OF THE INVENTION

In a first aspect of the present invention, a portable electronic device comprises a display facing in a first direction, a video camera facing in a second direction substantially opposite to the first direction, a wireless communications receiver operable to receive supplementary image data from a remote image source, the supplementary image data comprising an indication of where a supplementary image is positioned with respect to a reference image, and in which the portable electronic device is arranged in operation to display a captured image from the video camera on the display of the portable electronic device, and when the captured image comprises all or part of the reference image as displayed on a separate display associated with the remote image source, the portable electronic device is arranged in operation to display the supplementary image positioned with respect to the reference image, instead of the corresponding part of the captured image.

In another aspect of the present invention, a method of interactive viewing with a portable device comprising a video camera and a display comprises the steps of capturing an image displayed on a display associated with a remote image source with the video camera that comprises all or part of a reference image, wirelessly transferring supplementary image data from a remote image source to the portable device, the supplementary image data comprising an indication of where a supplementary image is positioned with respect to a reference image, and displaying a captured image from the video camera on the display of the portable device, with the supplementary image displayed positioned with respect to the reference image, instead of the corresponding part of the captured image.

Advantageously, the user can therefore hold the portable device up to the television to reveal hidden content displayed by the portable device. A number of different play and interaction modes thus become possible, such as revealing ghosts or magical items, using the portable device as a virtual magnifying glass (either to magnify a portion of the displayed image or to display a more detailed version of a region of the image), or as a pair of night-vision goggles or the like.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE EMBODIMENTS

A device and method for interactive viewing are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1A:
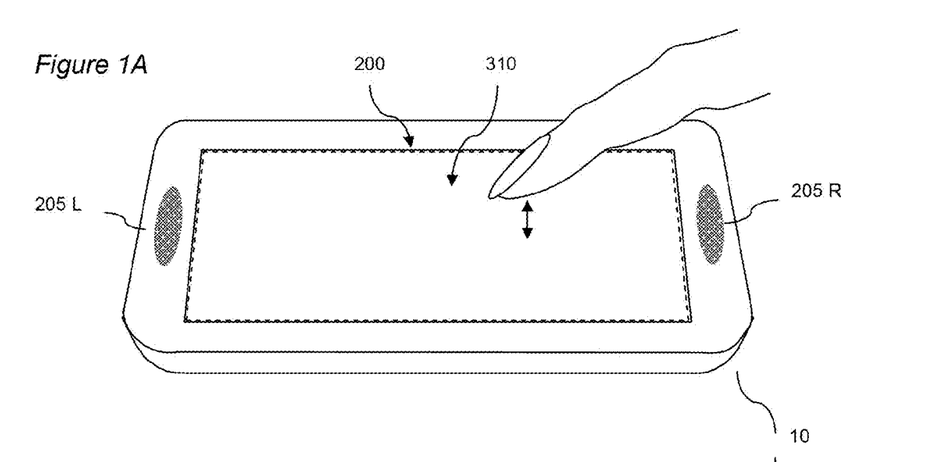
FIGS. 1A and 1B are schematic diagrams of a portable device in accordance with an embodiment of the present invention.
Figure 1B:
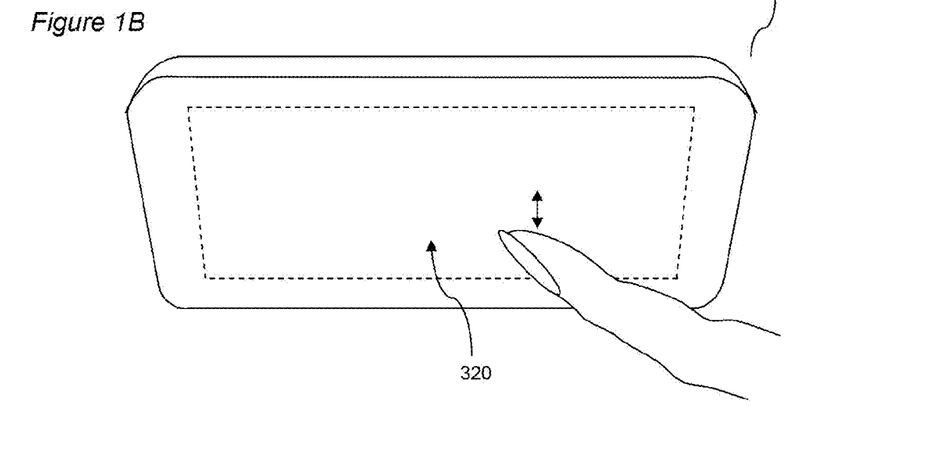

FIGS. 1A and 1B illustrate an embodiment of a portable electronic device (PED) 10. FIG. 1A shows a notional front or top face of the PED, whilst FIG. 1B shows a notional rear or bottom side of the PED. The front and rear faces are substantially parallel to one another.

On the front face, the PED comprises a display 200 and optionally one or more loudspeakers 205L, 205R.

On the rear side, the PED comprises a rear touch sensitive surface 320 (indicated by the dotted lines) having similar dimensions to the display 200. The rear touch sensitive surface is positioned so as to be substantially aligned with the display. That is to say, considered in a direction normal to the plane of the display, the rear touch sensitive surface substantially overlies the display.

Optionally, a transparent front touch sensitive surface 310 (indicated by the dotted lines in FIG. 1A) is also provided coincident with the display 200. The front and rear touch sensitive surfaces and the display thus have similar dimensions and placements on their respective faces of the device. The touch sensitive surfaces also have a similar resolution of touch localisation.

Figure 2:
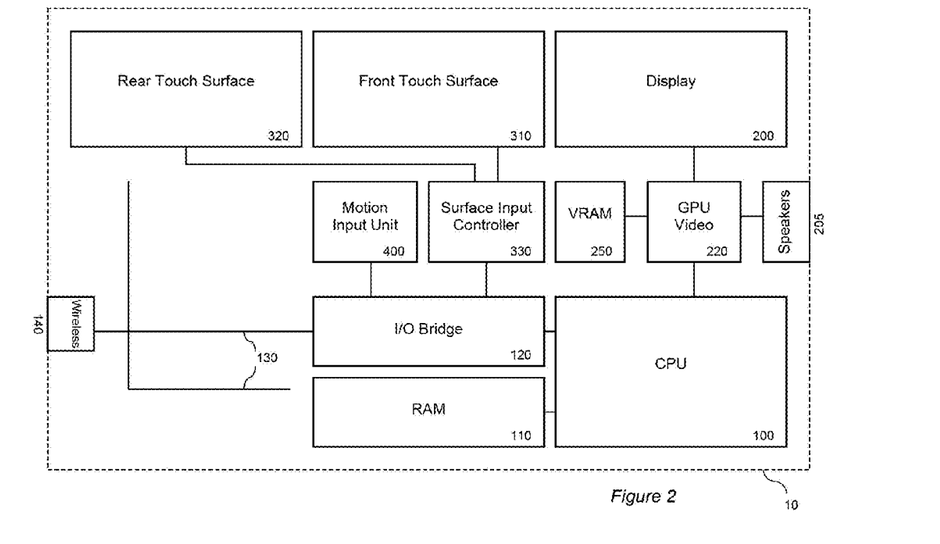
FIG. 2 is a schematic diagram of a portable device in accordance with an embodiment of the present invention.

Referring now to FIG. 2, an embodiment of the PED comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205LR (only one shown for clarity) and/or to a headphone jack socket (not shown). The GPU also outputs video information to the display 200. The display is typically a liquid crystal display (LCD) but may be an organic light emitting diode display (OLED) or similar suitable display technology.

In addition, the CPU communicates with an input/output bridge (I/O bridge) 120 that co-ordinates communication with peripheral components both integral to and linkable with the PED. In an embodiment of the PED the I/O bridge communicates with a surface input controller 330, which parses inputs from the rear touch sensitive surface 320 and optionally the transparent front touch sensitive surface 310. The I/O bridge also communicates with an optional motion input unit 400 comprising one or more micro electromechanical (MEMS) accelerometers and/or gyroscopes, to provide up to six axes of motion input (x, y and z axis lateral movement and roll, pitch and yaw rotational movement). The I/O bridge also communicates with a bus 130, upon which various peripheral devices may be linked, including one or more wireless communication units 140, such as for example WiFi and/or Bluetooth® communication units.

It will be appreciated that the CPU 100 may be a single core or multi core processor. Similarly, the RAM may be dynamic RAM or may comprise both dynamic RAM and static (e.g. flash) RAM units. Likewise, whilst the GPU typically uses dedicated VRAM, alternatively or in addition it may share common RAM with the CPU. Finally, it will be appreciated that the function of the surface input controller 330 may be performed by the CPU itself.

The rear touch sensitive surface may be a conventional capacitance touchpad or panel such as that found in laptop computers or portable telephones. Such a touchpad typically comprises two layers of parallel conductive lines separated by an insulator and arranged at right angles to one another. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the pad. Meanwhile, movement of a user's finger or fingers can be estimated from successive points of intersection where contact is detected.

A front touch sensitive surface for use with the display operates in a similar manner to the rear touch sensitive surface, but in this instance the conductive lines are typically transparent (as a non limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

It will also be appreciated that whilst not shown in the Figures for the purposes of clarity, the PED comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Figure 3:
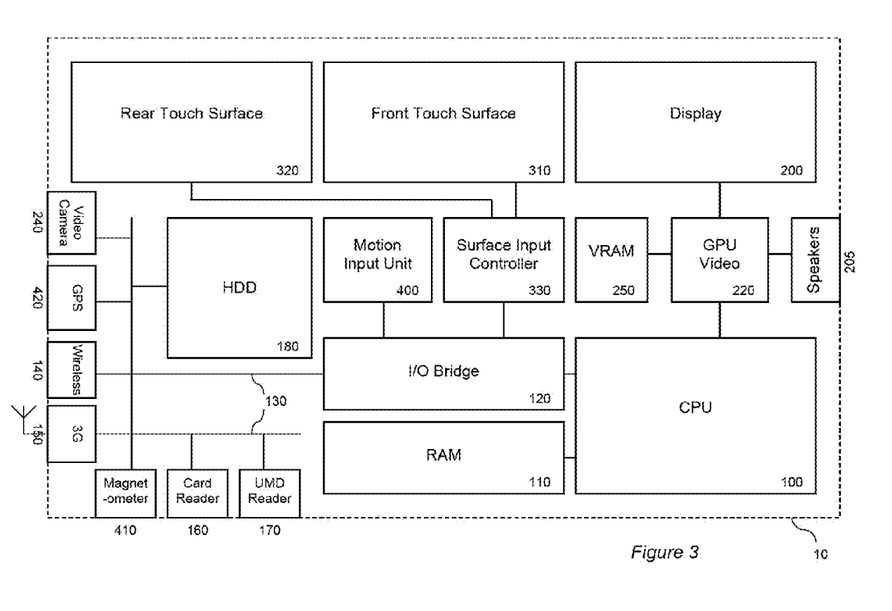
FIG. 3 is a schematic diagram of a portable device in accordance with an embodiment of the present invention.

Referring now also to FIG. 3, an embodiment of the PED may comprise one or more additional components, either integrated within the device or connectable to it. The additional components include, but are not limited to, the following.

a) A card reader 160 suitable for reading from and optionally writing to memory cards, such as a Sony® Memory Stick® card, or alternatively legacy memory cards such as those used by the Sony® Playstation 2® entertainment device. Such a reader may be integral to the PED or may connect to the bus 130 via a USB connection.

b) A universal media disk (UMD) reader 170 or other optical disk reader (such as a DVD or Blu-Ray® disk reader), for accessing media and/or game content stored thereon. Such a reader may be removably connectable to the bus 130 via a USB or proprietary connection.

c) A magnetometer 410 for determining compass direction (i.e. the current absolute orientation of the PED), mounted integral to the PED either on the bus 130 or as part of the motion input unit 400.

d) A third generation (3G) or other mobile telephony module 150. in an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via USB port or a Personal Computer Memory Card International Association (PCMCIA) slot.

e) A hard disk drive (HDD) 180 integral to the PED, providing bulk storage for audio/video media, downloaded games, and the like.

f) A GPS receiver 420. Again the GPS receiver may share an aerial with one or more other wireless units (such as WiFi) within the PED or may use its own aerial. Map information, where used, may be stored locally at the receiver, or in flash RAM of the PED, or on an HDD of the PED.

g) A video camera 240, typically comprising a charge coupled device (CCD) optical sensor and suitable optics for imaging onto the CCD. The resolution of the CCD may for example be 640×480 pixels, but may be any suitable resolution, such as for example 1920×1080 pixels (full HD). In an embodiment the video camera is integral to the PED, but alternatively may be removably connectable to the bus 130 via a USB or proprietary connection. An embodiment of the PED comprises two such video cameras 240, forming a stereoscopic pair.

In operation, the CPU accesses an operating system that is resident for example on a ROM, flash RAM or a hard disk. The operating system co-ordinates operation of the various functions of the PED and presents a user interface to a user of the device. The user interface will typically comprise graphical outputs via the display and touch based inputs, but may also include audio outputs and/or motion-based inputs.

The touch based inputs to the PED are peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point to the rear panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy).

Because of the relative orientation of the display and the rear touch panel, left-to-right mapping across the rear touch panel is therefore reversed to correspond to the appropriate position on the display. Optionally this reversal is switchable depending on the orientation of the device as detected by the motion input unit, and/or according to what peripheral devices are connected; for example if the PED were connected to a television and then held display-down for use, the left-to-right mapping of the touch panel input may not be reversed.

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them (i.e. with finger pressure on the rear panel) from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with a similar but transparent front touch sensitive surface overlaid on the display, further modes of interaction become possible. For example, objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to each other may be interpreted as a twisting action, and adjusts a virtual volume dial. A similar grammar of interaction could be used for example for document or e-book navigation, with scrolling, page selection and zoom replacing the above playback functions.

In an embodiment of the present invention, the PED comprises a camera 240 that is either rear-facing (i.e. mounted on the opposite side of the device to the display) or can be swivelled to be rear facing. That is to say, the camera faces in the opposite direction to the viewing direction of the display. The PED can then display the captured image on the display.

The camera has a field of view sufficient to encompass the field of view that might be perceived by a user looking through an aperture in the device equivalent in size and position to the display. Where the camera is in a fixed relation to the display (i.e. built-in to the device), then a predetermined offset and scaling of the captured image may be performed to generate the field of view equivalent to looking through a transparent display window equivalent in size, position and orientation to those of the PED. Otherwise, the user may follow a calibration process to achieve the effect.

Figure 4A:
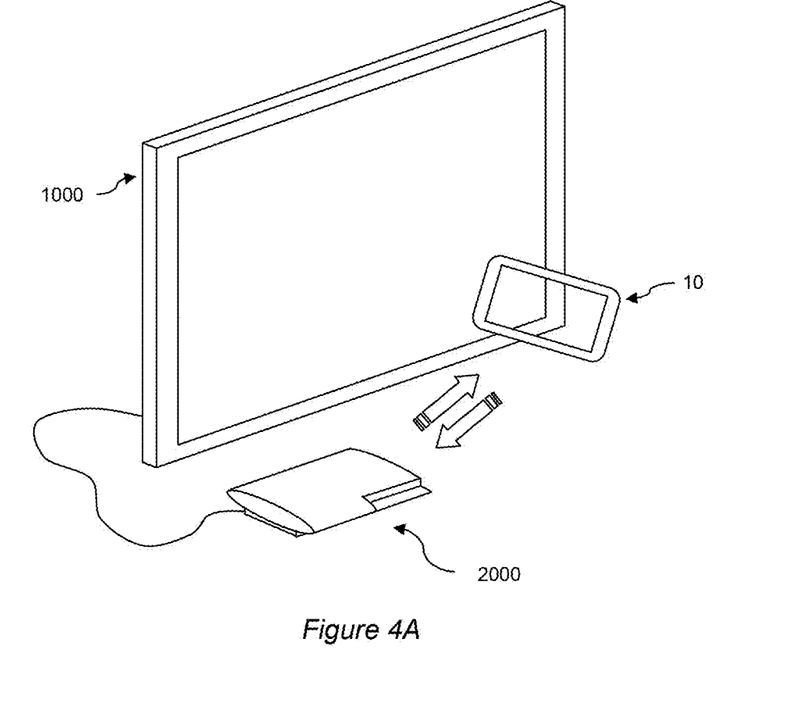
FIG. 4A is a schematic diagram of a system in accordance with an embodiment of the present invention.

The user may then orient the device so that the window (as displayed using the captured and processed video image) encompasses some or all of the television 1000.

The basic principle is that the PED's camera captures video images which may include a view of all or part of a displayed reference image, e.g. an image generated by a PS3 machine acting as a remote image source and displayed on a television or other display screen associated with the PS3 that is within view of the PED's camera. The PED, via image analysis carried out in cooperation with the PS3 machine, can identify the reference image or part of the reference image in its captured images; supplement the captured reference image with supplementary image data received from the PS3 machine; and display the supplemented image on the PED's own display screen.

So the term "reference image" can refer to the original image generated by the PS3 and displayed on the television or other display screen associated with the PS3 machine, or in other contexts it can refer to the version of the displayed reference image as captured by the PED's camera.

Subsequent processing steps can be implemented by either the PED or the media/games image source, for example a PS3 machine, acting as a remote image source ("remote" being defined with respect to the PED, i.e. the PS3 machine is not directly connected to or part of the PED), with data relevant to the next step being passed between the PED and the image source depending on where and how a handover of the processing occurs.

However, for simplicity and by way of a non-limiting example, the following description locates the majority of the processing at the PED. The PED is arranged to detect the television image (reference image) or part of an image within the field of view of the window. This may be achieved in one or more ways. In some examples, the PS3 machine causes markers such as a coloured boundary to be displayed as part of the television image. In other examples, the PS3 machine sends a version of its currently displayed television image to the PED so that the PED can correlate it against its own captured image. The examples are:

i. For a whole TV image, simply identify a bright rectangle or trapezoid (accounting for perspective) within the field of view (an arbitrarily shaped bright region may instead be detected as corresponding to a partial TV image);

ii. For all or part of a TV image having a predetermined colour border (e.g. a border inserted or placed into the images by the PS3 machine generating those images), identify a boundary of that particular colour; and/or iii. For all or part of a TV image, correlate the captured image with a (optionally scaled down) version of the currently displayed reference image received from the PS3 machine, to identify which part of the field of view corresponds to the TV image (or conversely which part of the TV image corresponds to the field of view).

It will be appreciated that alternatively the PED could transmit its field of view (i.e. the image as captured by the PED) to the PS3 machine, which could perform any or all of the above detection schemes instead.

The PED transmits information to the PS3 machine derived from the PED's captured image and characterising the position and shape (i.e. the outline, edges or periphery) of the captured image of the TV screen (i.e. the position and shape of the reference images as captured by the PED). The image displayed on the TV screen is treated as a reference image.

Again, this information characterising the position and shape of the captured image of the TV screen may constitute one or more types of information:

i. For a whole TV image, parameters identifying the position of corners of the TV image (i.e. the reference image), or of corners of a displayed border within the reference image, within the PED's view;

ii. For a partial TV image, parameters identifying one or more corner positions of the screen or reference image in the PED's view and the direction of edges of the screen, reference image or a displayed border from these corners;

iii. For a partial TV image, parameters identifying one or more corner positions in the PED view and an estimation of the relative angle of the TV screen to the PED based upon the distortion of any one of; the edge of the TV screen or displayed image, a displayed border around the image, or the image itself (as compared with a received reference image from the remote image source);

iv. Parameters identifying the region of the TV image captured in the PED field of view based upon correlation or similar comparison with a received reference image; and v. The section of the captured image previously identified as the television screen.

It will also be appreciated that one or more of these parameters may be generated by a PS3 machine on receipt of the field of view captured by the PED and transmitted back to the PED. Or the PED could generate and transmit these parameters in addition to transmitting its captured image to the PS3 machine.

Whether information simply localising the TV image is transmitted, or additionally information is sent characterising any change in perspective caused by the relative positions of the TV image and the PED, depends on whether the PS3 machine or the PED will subsequently correct for any such perspective based distortion of the captured TV image. Next, the PS3 machine, acting as the remote image source, transmits any supplementary image data that should appear within the region of the television captured by the PED, including an indication of where this should be displayed (i.e. positioned with respect to the reference image, being the television image displayed on the TV by the PS3 machine). Again this may be achieved in a number of ways:

i. the PS3 machine transmits a replacement version of the captured region of the television image, with the supplementary image data already included in the appropriate position by the PS3 machine, either with or without appropriate distortion due to perspective;

ii. the PS3 machine transmits a replacement version of the whole captured image with the supplementary image data already included at the appropriate position and with appropriate distortion due to perspective; and/or iii. the PS3 machine transmits the supplementary image data in isolation, either with or without appropriate distortion due to perspective, together with placement information; the placement information may be with reference to the TV image or with reference to the PED display of the captured image (which thereby also provides information about where the image will be placed with respect to the TV image as seen within the PED's captured image).

It will be apparent that transmitted versions of images need only be at a resolution suitable for display by the PED, which may be lower than the native resolution of the image on the TV.

In embodiments of the invention, the PED displays the captured image of the TV screen (including some or all of the reference image) but replaces or superposes (overlies) the received image elements on its display, performing image processing to distort the image elements due to perspective if necessary.

Alternatively or in addition, the PED unconditionally receives supplementary image data in advance (i.e. before it will be required for display and before a particular video image has been captured in which it subsequently gets displayed). Such prior-transferred supplementary data can be stored on a pre-recorded storage medium associated with the PED, or can be transmitted wirelessly to the PED in dependence on the media currently being displayed by the PS3 machine. In either instance, the PED retains a copy of the supplementary image data.

As a result, the PED can access the advance-received supplementary image data from internal memory as required rather than having to wait to receive it from the PS3 machine at the point of need. In this case the PED potentially does not need to transmit any data to the PS3 machine at all (beyond what is necessary to maintain a link to identify or receive such data), though of course the PED can still delegate image processing (for example image correlation) to the PS3 machine by transmitting all or part of its captured video to the PS3 machine. In this case, in an embodiment the PS3 machine will transmit parameters characterising the captured image of the TV screen to the PED, rather than the other way around.

Where supplementary image data is received in advance, and in particular for games where the viewpoint displayed on the TV is not predetermined, optionally the supplementary image data may comprise a 3D object and textures for the PED to render itself according to position and optionally z-buffer information sent to the PED by the PS3 machine once the viewpoint for the current frame (i.e. the one also captured by the video camera) is known. The appropriate rendering parameters (e.g. size, orientation, lighting and angle of view) can be derived by the PED or by the PS3 (and then transmitted to the PED).

For videogames, rendered graphics to transmit as supplementary images may be generated as follows. Because the supplementary image data itself may take the form of objects that exist within a game environment, in an embodiment of the present invention the full game environment is rendered normally, but such supplementary objects are rendered with an alpha value (transparency) of zero (fully transparent) within the displayed image on the TV. The rendered objects may then be extracted, by the PS3 machine, from the PS3 machine's graphics memory and transmitted to the PED without the alpha value, whilst maintaining all clipping and occlusion information from foreground objects so as to appear consistent when revealed by the PED. In other words, the displayed game environment and the non-displayed supplemental images for transmission to the PED are both rendered from the same viewpoint, so that when united on the PED display screen they still look like they were rendered as one.

In other words, in such an embodiment the display generation means (or display generator) renders a viewpoint of a virtual environment to generate a reference image for display, and renders one or more supplementary elements of that same virtual environment at the same viewpoint as supplementary images for transmission to the remote portable device.

Alternatively or in addition, objects may be rendered separately, or may be pre-rendered.

For pre-recorded media, supplementary image data can take the form of a separate second angle (i.e. different viewpoint) pre-recorded image stream that is accessed by the PS3 machine instead of the primary angle (main viewpoint) image stream for that part of the TV image to be transmitted by the PS3 machine to the PED. The second angle image is similar to the primary angle image but for the supplementary image components (i.e. no actual change in angle is required). It will be appreciated that where other mechanisms are provided by the pre-recorded media and player, these may similarly be used (for example, decoding a picture-in-picture director's commentary to send to the PED).

In addition to supplementary image data, audio data may also be transmitted to the PED to provide audio associated with the revealed images; these may be in-game sound effects (such as the sound of a ghost), or may be a separate audio track (such as a director's commentary), depending on the nature of the material being shown.

It will be appreciated that preferably the above processing occurs within a single frame duration (i.e. typically $\frac{1}{50}^{th}$ or $\frac{1}{60}^{th}$ of a second). To reduce the computational load of either the PED or the PS3 machine, it can be assumed that the position and orientation of the PED relative to the television does not move much within a $\frac{1}{50}$ or $\frac{1}{60}$ second interval, and so a previous estimate passed upon image analysis can be either re-used plural times, or used to extrapolate a new estimate (for example using a Kalman filter and successive estimates).

Thus, for example, if analysis on one image frame takes $\frac{1}{20}^{th}$ second (i.e. has a three frame lag), then the PED may only analyse every third frame to update the Kalman filter, and instead rely on filter predictions (based on past data) to characterise the present captured image, e.g. to predict the relative angle between the displayed reference image and the PED's video camera.

Similarly, where transmission of the supplementary image data may take an appreciable fraction of a frame duration, the PS3 machine may transmit supplementary image data one frame in advance, again based upon motion prediction. However, typically the image data will be relatively small in size and will transmit over a Bluetooth® or similar wireless connection sufficiently quickly. As noted previously, alternatively or in addition supplementary image data resources can be uploaded to the PED in advance.

It will also be appreciated that the designer of the game may elect to only include such features where motion within the game is slow and predictable; for example a user may have to enter a so-called "stealth" mode to see the hidden features. Indeed, once the PS3 machine detects or is notified that the PED has captured some or all of the PS3 machine's displayed output, this may trigger initiation of such a mode for the current user.

It will be appreciated that the view 'through' the display to the user's environment will look best where the captured and displayed view subtends a viewing angle consistent with the distance of the PED from the user's face.

In an embodiment of the present invention, such an angle is set to correspond to an average holding position for users, optionally adjustable via a user interface. Helpfully, users also tend to hold the device at the distance that looks best in any case. However, in an embodiment of the present invention, the PED also comprises a camera facing in the same direction as the display (i.e. toward the user), and with this camera the distance to the user's face is automatically gauged and the display angle adjusted accordingly, by recognising the image position of the user's face by known face recognition techniques, estimating the absolute (real life) size of the user's face and deriving a camera to face distance based on the apparent image size of the user's face.

Figure 4B:
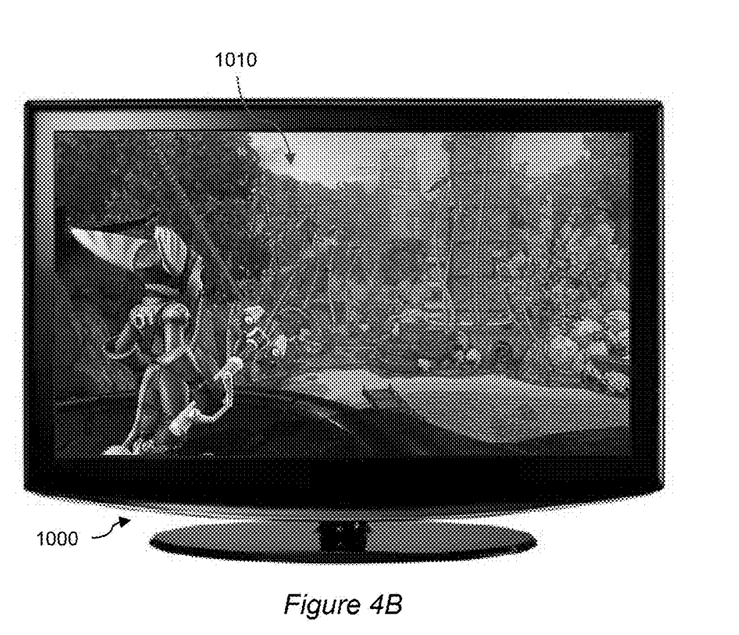
FIG. 4B is a schematic diagram of a television displaying a reference image in accordance with an embodiment of the present invention.
Figure 4C:
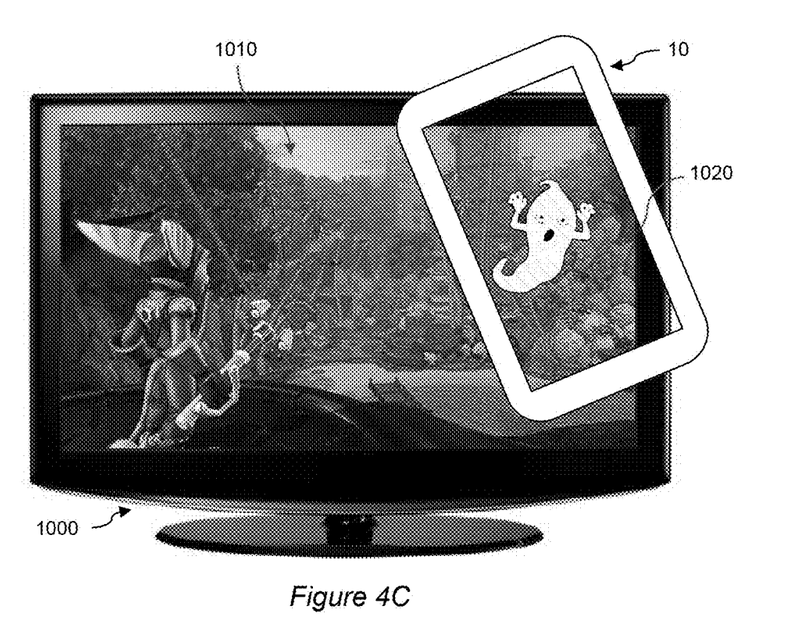
FIG. 4C is a schematic diagram of a television displaying a reference image and a portable device displaying a captured image with a supplemental image element, in accordance with an embodiment of the present invention.

With reference to FIGS. 4A, 4B and 4C, in an example embodiment of the present invention a game 1010 is being played on a PS3 machine 2000 acting as a display generation arrangement and a corresponding reference image is presented on a television (TV) 1000 (FIG. 4A). The example reference images in FIGS. 4B and 4C show a mythical character (towards the left side of the displayed images) overlooking a woodland scene having obstacles and other characters in the distance. But the exact content of the reference images has no technical relevance to the present discussion other than to provide an example for discussing the use of a PED to overlay images.

In addition, the PS3 machine comprises a wireless interface (acting as a wireless transmitter and/or receiver) that is in wireless communication with a remote PED 10 (i.e. remote with respect to the PS3 machine) that comprises a display screen and a video camera that faces (or can be turned to face) in the opposite direction to the portable device's display screen. The PED's display screen can thus display the view captured by the camera behind the display screen. With suitable optics on the camera, and/or suitable shifting and scaling of the captured image, the screen can therefore be arranged to appear like a window through the device, displaying all or part of the view from the camera that is consistent with a view through an aperture or window in the device the same size as the PED's display screen. The PED transmits a representation of this view to the PS3 machine, which detects whether the view includes some or all of the image that it is currently displaying to the TV. If so, then using any of the techniques described above, the PS3 machine transmits a modified version of the view, or a supplemental image component, for the portable device to incorporate into its displayed view.

Thus, for example, a user could hold the PED up close to the television and see, in the view shown by the portable device, a ghost 1020 within the game that is not visible on the television display, or treasure or fingerprints or other hidden objects (FIG. 4C). Other options include using the portable device as a magnifying glass, displaying an enlarged version of a portion of the TV display, or as night-vision goggles, replacing the image on the television captured by the portable device with a simulated infra-red viewer version generated for example by the PS3 machine, and/or creating the illusion of creatures climbing out of the television screen. The appropriate angles for generating such image components can be derived from the difference between the rectangular image on the TV screen and the perspective distortion seen in the image captured by the portable device.

Figure 5:
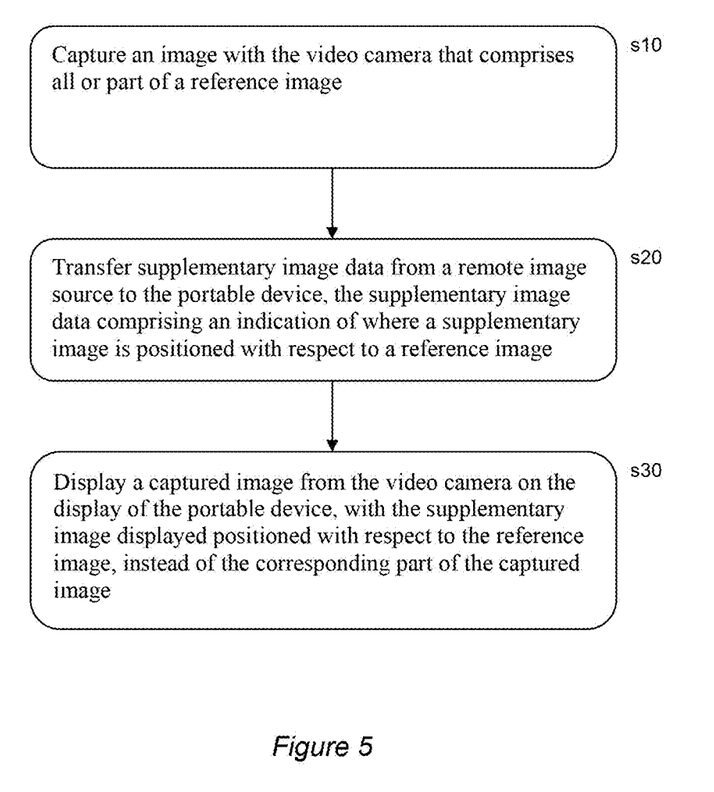
FIG. 5 is a flow diagram of a method of interactive viewing in accordance with an embodiment of the present invention.

In addition to game content, additional content for pre-recorded media can be accessed in a similar manner, with the content either being included with the pre-recorded media, or being downloaded when a connection to a suitable portable device is detected. Referring now to FIG. 5, a method of interactive viewing with a portable device comprising a video camera and a display (e.g. the PED) comprises:

in a first step s10, capturing an image with the video camera that comprises all or part of a reference image (e.g. the image displayed on the TV);

in a second step s20, transferring supplementary image data from a remote image source (e.g. the PS3 machine) to the portable device, the supplementary image data comprising an indication of where a supplementary image is positioned with respect to a reference image; and in a third step s30, displaying a captured image from the video camera on the display of the portable device, with the supplementary image displayed positioned with respect to the reference image, instead of the corresponding part of the captured image.

It will be appreciated from the description above that the first and second steps may be reversed.

Variations in the above method corresponding to operation of the various embodiments of the apparatus as described and claimed are considered within the scope of the present invention, including but not limited to:

analysing the captured image to detect all or part of a reference image captured within that captured image, the analysis comprising any of identifying a bright rectangle or trapezoid within the captured image, identifying a boundary of a particular colour within the captured image, and correlating the captured image with a version of the reference image;

analysing the captured image to characterise the shape and position of a or part of a reference image as found in the captured image, the analysis comprising any of identifying the position of corners of the reference image, or the position of corners of a displayed border within the reference image, or one or more corner positions of the reference image and the direction of edges from the or each corner, or identifying the region corresponding to the reference image in the captured image based upon correlation with a version of the reference image;

estimating the relative angle between the displayed reference image and the video camera, based upon distortion of the reference image as captured by the video camera with respect to a version of the reference image from the remote image source;

Optionally not for every captured frame; instead, it is possible to predict the relative angle between the displayed reference image and the video camera based upon one or more previous estimates of the relative angle;

wirelessly transferring supplementary image data from the remote image source to the portable device by transferring a replacement version of the region of the reference image captured by the video camera, with the supplementary image data already included in the appropriate position with respect to the reference image, or transferring a replacement version of the whole captured image, with the supplementary image data already included in the appropriate position with respect to the reference image;

Alternatively, the supplementary image can be transferred in isolation, together with placement information for placing the supplementary image in the appropriate position with respect to the reference image as found in the captured image;

if so, the supplementary image can be transferred to the portable device prior to capturing an image in which the supplementary image is displayed;

the reference image can be a graphic image of a virtual environment rendered from a particular viewpoint, in which case the supplementary image can comprise one or more elements of the same virtual environment rendered from the same viewpoint as the reference image;

the reference image can equally be a pre-recorded video image, and the supplementary image comprises a separate pre-recorded video image.

In addition, audio associated with the supplementary image can also be transferred to the portable device.

Finally, it will be appreciated that the methods disclosed here may be carried out on suitable hardware adapted as applicable by software instruction or by the inclusion or substitution of dedicated hardware.

Thus the required adaptation to existing parts of a device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A portable electronic device, comprising:
a display facing in a first direction;
a video camera facing in a second direction substantially opposite to said first direction;
a wireless communications receiver operable to receive supplementary image data from a remote image source, said supplementary image data comprising an indication of where a supplementary image is positioned with respect to a reference image;
and in which:
said portable electronic device is arranged in operation to display a captured image from said video camera on said display of said portable electronic device; and
when said captured image comprises all or part of said reference image as currently displayed on a separate display associated with the remote image source, said portable electronic device is arranged in operation to display said supplementary image positioned with respect to said reference image according to said received indication, to replace or overlie a corresponding part of said captured image.

2. A portable electronic device according to claim 1, comprising:
a transmitter operable to transmit all or part of said captured image and/or data derived from said captured image; and in which said wireless communications receiver is operable to receive one or more selected from the list consisting of:
i. a replacement version of all or part of said captured image with said supplementary image included at an appropriate position; and
ii. data characterising a shape and position of at least a part of said reference image as found in said captured image.

3. A media viewing system comprising:
a portable electronic device according to claim 1; and
an entertainment device operable as said remote image source;
the entertainment device comprising:
a display generator arranged in operation to output said reference image for display;
a wireless transmitter operable to transmit supplementary image data to said portable electronic device, said supplementary image data comprising an indication of where a supplementary image is positioned with respect to a given reference image.

4. A entertainment device according to claim 3, in which said display generator renders a viewpoint of a virtual environment to generate a selected reference image for display, and renders one or more supplementary elements of that same virtual environment at the same viewpoint as supplementary images for transmission to said remote portable device.

5. A method of media viewing with a portable device comprising a video camera and a display, the method comprising the steps of:
capturing an image with said video camera that comprises all or part of a reference image as currently displayed on a display associated with a remote image source;
wirelessly transferring supplementary image data from said remote image source to said portable device, said supplementary image data comprising an indication of where a supplementary image is positioned with respect to said reference image; and
displaying a captured image from said video camera on said display of the portable device, with said supplementary image displayed positioned with respect to said reference image according to said received indication, to replace or overlie a corresponding part of said captured image.

6. A method according to claim 5, comprising the step of:
analysing said captured image to detect all or part of a given reference image within said captured image, the analysis comprising one or more selected from the list consisting of:
i. identifying a bright rectangle or trapezoid within said captured image;
ii. identifying a boundary of a particular colour within said captured image; and
iii. correlating said captured image with a version of said reference image.

7. A method according to claim 5, comprising the step of:
analysing said captured image to characterise a shape and position of at least a part of a given reference image as found in said captured image, the analysis comprising one or more selected from the list consisting of:
i. identifying the position of corners of said given reference image;
ii. identifying the position of corners of a displayed border within said given reference image;
iii. identifying one or more corner positions of said given reference image and the direction of edges from at least one of the corners; and
iv. identifying a region corresponding to said reference image in said captured image based upon correlation with a version of said reference image.

8. A method according to claim 5, comprising the step of:
estimating a relative angle between said displayed reference image and said video camera, based upon distortion of said reference image as captured by said video camera with respect to a version of said reference image from said remote image source.

9. A method according to claim 8, comprising the step of:
predicting the relative angle between said displayed reference image and said video camera based upon one or more previous estimates of said relative angle.

10. A method according to claim 5, in which the step of wirelessly transferring supplementary image data from said remote image source to said portable device comprises one selected from the list consisting of:
i. wirelessly transferring a replacement version of a region of the reference image captured by said video camera, with said supplementary image data already included in an appropriate position with respect to said reference image; and
ii. wirelessly transferring a replacement version of the whole captured image, with said supplementary image data already included in the appropriate position with respect to said reference image.

11. A method according to claim 5, in which the step of wirelessly transferring supplementary image data from said remote image source to said portable device comprises:
transferring said supplementary image data in isolation, together with placement information for placing said supplementary image data in the appropriate position with respect to said reference image as found in said captured image.

12. A method according to claim 11, in which the step of wirelessly transferring supplementary image data from said remote image source to said portable device comprises wirelessly transferring said supplementary image data to the portable device prior to capturing an image in which said supplementary image is displayed.

13. A method according to claim 5, in which said reference image is a graphic image of a virtual environment rendered from a particular viewpoint, and said supplementary image comprises one or more elements of the same virtual environment rendered from the same viewpoint as said reference image.

14. A method according to claim 5, in which said reference image is a pre-recorded video image, and said supplementary image comprises a separate pre-recorded video image.

15. A non-transitory, tangible computer-readable storage medium on which computer readable instructions of a computer program are stored, the instructions, when executed by a computer, cause the computer to perform a method of media viewing with a portable device comprising a video camera and a display, the method comprising:
capturing an image with said video camera that comprises all or part of a reference image as currently displayed on a display associated with a remote image source;
wirelessly transferring supplementary image data from said remote image source to said portable device, said supplementary image data comprising an indication of where a supplementary image is positioned with respect to said reference image; and
displaying a captured image from said video camera on said display of the portable device, with said supplementary image displayed positioned with respect to said reference image according to said received indication, to replace or overlie a corresponding part of said captured image.

\* \* \* \* \*